United States Patent [19]

Slater

[11] Patent Number: 5,734,203

[45] Date of Patent: Mar. 31, 1998

[54] HEADLIGHT CIRCUIT

[76] Inventor: Benjamin Daniel Slater, 2211 E. Mohawk Rd., No. St. Paul, Minn. 55109

[21] Appl. No.: 748,931

[22] Filed: Nov. 14, 1996

[51] Int. Cl.$^6$ ............................................. B60Q 1/04
[52] U.S. Cl. .................. 307/10.8; 307/10.8; 307/10.1; 315/77; 315/82; 361/195; 364/424.059
[58] Field of Search ........................... 307/9.1, 10.1, 307/10.8; 315/76, 77, 78, 79, 80, 81, 82, 83, 84; 340/425.5, 457, 458, 459, 468, 469, 475, 476, 477, 478, 463; 361/160, 170, 189, 195; 364/423.098, 424.045, 424.059

[56] References Cited

U.S. PATENT DOCUMENTS

| | | | |
|---|---|---|---|
| 3,603,840 | 9/1971 | DuRocher | 315/77 |
| 4,723,095 | 2/1988 | Svazas | 315/82 |
| 4,727,290 | 2/1988 | Smith | 315/82 |
| 4,812,808 | 3/1989 | Ulrich | 340/475 |
| 5,075,593 | 12/1991 | Shoda | 307/10.8 |
| 5,081,565 | 1/1992 | Nabha | 340/469 |
| 5,086,253 | 2/1992 | Lawler | 307/10.8 |
| 5,109,214 | 4/1992 | Heidman | 340/463 |
| 5,220,245 | 6/1993 | Honda | 315/83 |
| 5,245,251 | 9/1993 | Irick | 307/10.8 |
| 5,473,306 | 12/1995 | Adell | 340/468 |

*Primary Examiner*—William M. Shoop, Jr.
*Assistant Examiner*—Peter Ganjian
*Attorney, Agent, or Firm*—Thomas B. Tate

[57] ABSTRACT

A headlight circuit for an automobile which has two versions. One version can be used in automobiles which do not have daytime running lights and the other version can be used in automobiles which have daytime running lights. The circuit includes headlights which have high beam and low beam filaments, a high beam switch, a low beam switch, a battery, a turn signal switch, and three relays.

2 Claims, 2 Drawing Sheets

HEADLIGHT CIRCUIT

SUMMARY AND BACKGROUND OF THE INVENTION

When a vehicle's headlights are on a high beam (or if a daytime running lights are in use), it may be difficult for an oncoming motorist to see the vehicle's flashing turn signals, causing an accident. Therefore, there arises a need to switchover the headlights of the vehicle to low beam upon activation of any of the turn signals. This would enable the oncoming motorists to see the vehicle's flashing turn signals.

The object of the invention is to provide a headlight circuit which activates the low beam and deactivates the high beam or the daytime running lights while the turn signal is flashing.

DESCRIPTION OF THE INVENTION

The invention is a vehicle headlight circuit which may be used in any vehicle including those having daytime running lights.

Figure 1:
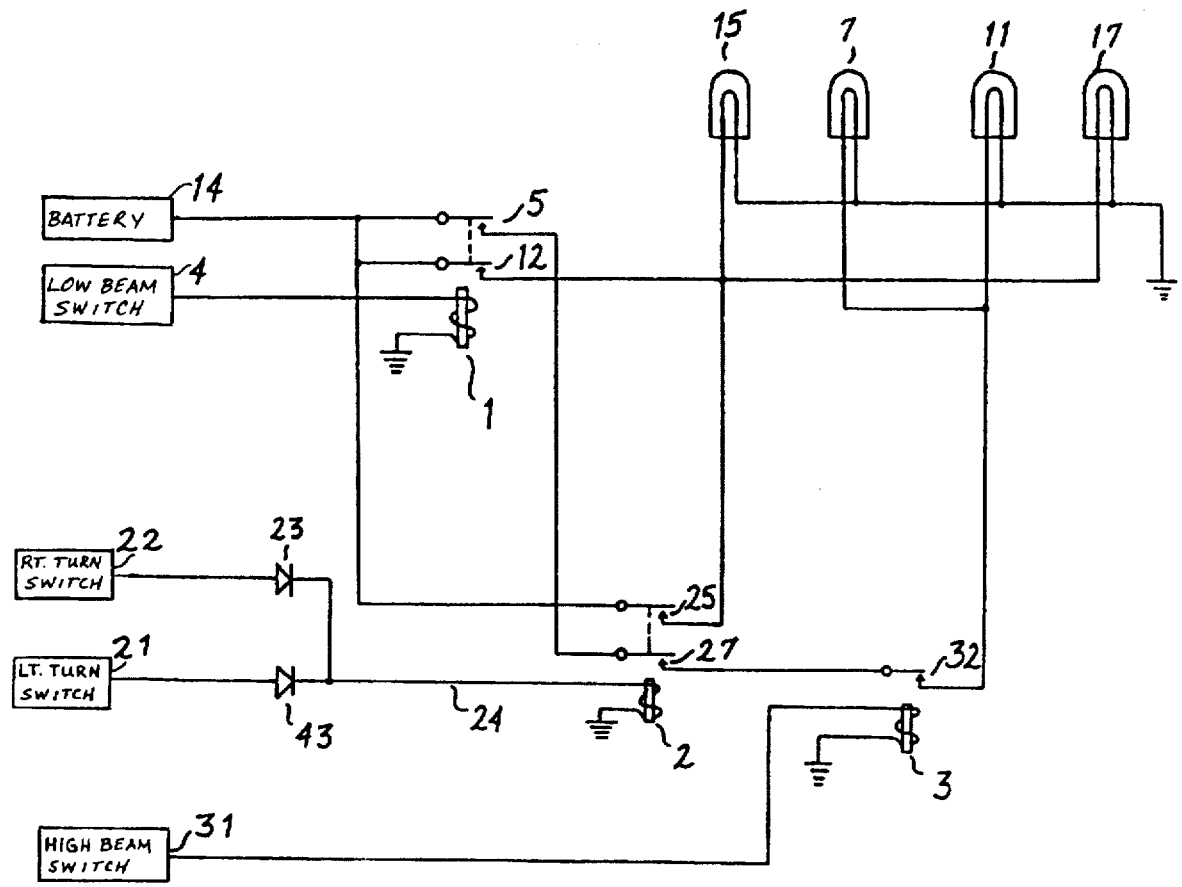
FIG. 1 is a wiring diagram of the headlight circuit without daytime running lights.

Referring to the drawing Figures in detail and in particular to drawing FIG. 1, there is shown a vehicle headlight circuit embodying the present invention including a relay 1 which is a double-pole single-throw (DPST) relay with two normally open contacts 5 and 12 (contacts remain open if no current flows there through). Upon activation of a low beam switch 4, both contacts 5 and 12 close. Contact 5 closes to enable (but does not turn on) the high beam filaments 7 (left headlight) and 11 (right headlight) and the contact 12 supplies current from the battery 14 to the low beam filaments 15 (left headlight) and 17 (right headlight), turning the low beam on.

The left turn switch 21 and the right turn switch 22 are combined through the two diodes 23 and 43 to form the control signal 24 for relay 2. Relay 2, a DPST relay has two sets of contacts 25 and 27. Contact set 25 is a normally open contact and contact set 27 is normally closed. The normally open contact 25 closes when either the right turn signal switch 22 or the left turn signal switch 21 is activated. This supplies current to the low beam filaments 15 and 17 to turn them on as long as the signal 24 is activated. If the low beam is already on, the closure of the contacts in relay 2 is redundant.

If the high beam switch 31 is activated and the control signal 24 is off, the high beams 7 and 11 will light if the low beam lamps 15 and 17 are already on. If the low beams 15 and 17 are off, the contact 5 of relay 1 will be open, thus preventing power from reaching relays 2 and 3. The high beam circuit contacts 27 of relay 2 are normally closed (that is, closed if there is no coil current). The contacts 32 of relay 3, which is a single-pole single-throw (SPST) relay, will close when the high beam switch 31 is activated. If the control signal 24 (right 22 or left 21) is activated when the high beam is on, the normally closed contacts 27 of relay 2 will open and break the current path to the high beam filaments 7 and 11. Hence the high beams are always off whenever the control signal 24 is active.

The operation of this circuit can be summarized as follows: If both the high and low beams are off, the activation of the turn signal switch (right or left) will turn the low beam filament on and it remains steadily on as long as the turn signal switch is on. If the low beam is on and high beam is off, the activation of the turn signal switch has no effect on the headlights. If the low beam is off, the high beam will not light even if the high beam switch is activated. If the low beam is on and the high beam is on, the activation of the turn signal switch (left or right) will turn the high beam off, but the low beam is unaffected.

Figure 2:
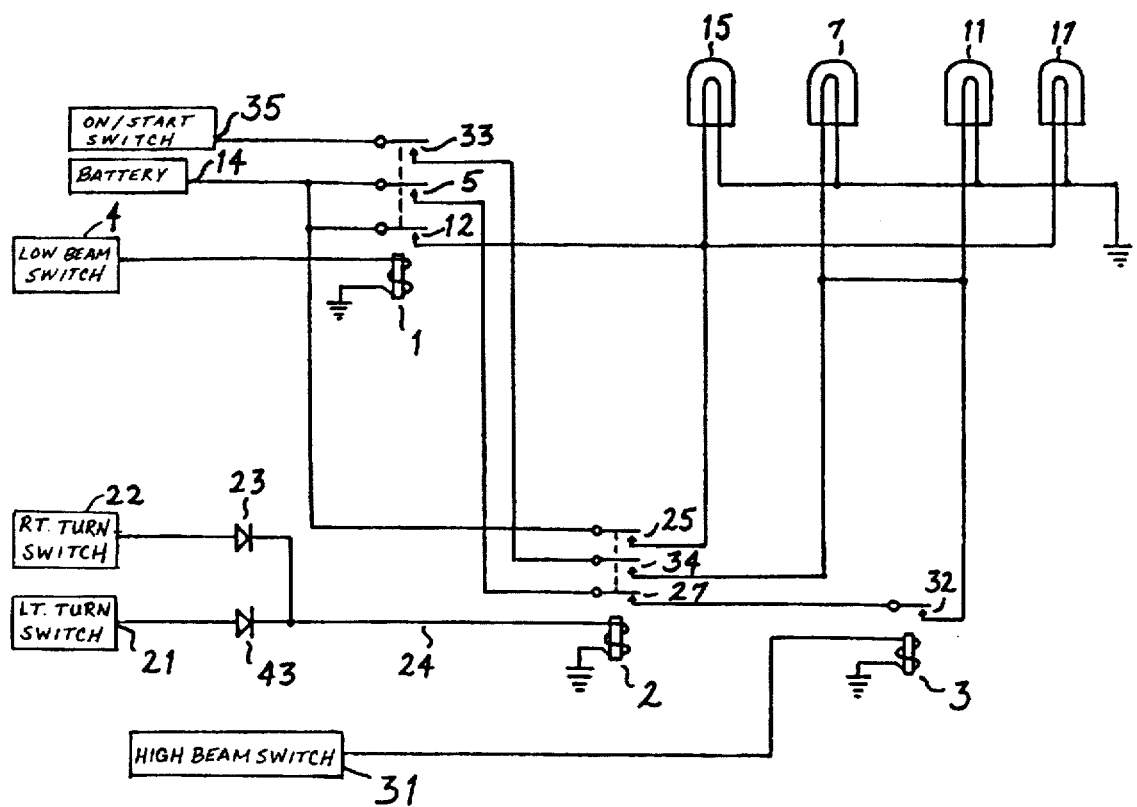
FIG. 2 is a wiring diagram of the headlight circuit with daytime running lights.

The circuit with daytime running lights (shown in FIG. 2) operates the same as the circuit without daytime running lights with the exception that if the low beam is off and the turn signal switch is not activated, the high beam filaments will be lit at reduced intensity, thus serving as daytime running lights. If the low beam is turned on, the daytime running lights turn off. If the turn signal switch is activated, the daytime running lights turn off.

This circuit is almost identical to the circuit without daytime running lights. The differences are that the relays 1 and 2 are triple-pole single-throw relays which each have an extra set of normally closed contacts 33 and 34 respectively, which along with the switch 35 provide the current path and controls for the daytime running lights. The differences are that the relays 1 and 2 are triple-pole single-throw relays which each have an extra set of normally closed contacts 33 and 34 respectively, which along with the on and start switch 35 provide the current path and controls for the daytime running lights.

I claim:

1. A headlight circuit for an automobile, said circuit comprising:

headlights, each of which has a high beam filament and a low beam filament;

a high beam switch;

a low beam switch;

a fused battery;

a right turn switch and a left turn switch associated with a pair of diodes the output of which is a control signal;

a first relay having two normally open contacts;

a second relay having a normally open contact and a normally closed contact;

a third relay having a normally open contact;

wherein said high beam switch is coupled to said third relay; said low beam switch is coupled to said first relay; said battery is coupled to said first relay and to said second relay; said right turn switch and said left turn switch are coupled to said second relay; said first relay is coupled to said headlights and to said second relay; said second relay is coupled to said headlights and to said third relay; and said third relay is coupled to said headlights;

wherein said circuit operates as follows:

activation of said low beam switch closes said normally open contacts of said first relay to enable said high beam filaments and to supply current to turn on said low beam filaments;

activation of either said right turn switch or said left turn switch closes said normally open contact of said second relay to supply current to said low beam filaments to turn said low beam filaments on as long as said turn switch is activated;

activation of said high beam switch closes said normally open contact of said third relay to provide current to turn on said high beam filaments, provided that said low beam filaments are already turned on;

activation of either said right turn switch or said left turn switch while said high beam filaments are on opens said normally closed contact of said second relay to break the current path to said high beam filaments, thus turning off said high beam filaments while said turn switch is activated.

2. The headlight circuit of claim 1 wherein said circuit is additionally provided with a switch having on and start positions, said switch coupled to said first relay, and wherein said first relay and said second relay each have an additional normally closed contact in order to permit said high beam filaments to be lit at reduced intensity to serve as daytime running lights when said low beam filaments are off and said signal control is not activated, and wherein said daytime running lights turn off when said low beam filaments are turned on or when said signal control is activated.

* * * * *